Sept. 19, 1944.　　　B. E. KIEST　　　2,358,400
BEET HARVESTER
Filed Dec. 3, 1942　　　5 Sheets-Sheet 1

Inventor
BERT E. KIEST
By Lacey & Lacey,
Attorneys

Sept. 19, 1944.　　　B. E. KIEST　　　2,358,400
BEET HARVESTER
Filed Dec. 3, 1942　　　5 Sheets-Sheet 4

Inventor
BERT E. KIEST
By Lacey & Lacey,
Attorneys

Patented Sept. 19, 1944

2,358,400

UNITED STATES PATENT OFFICE 2,358,400

BEET HARVESTER

Bert E. Kiest, Pocatello, Idaho

Application December 3, 1942, Serial No. 467,771

5 Claims. (Cl. 55—9)

This invention relates to harvesters and more particularly to a machine for topping and harvesting sugar beets.

The object of the invention is to provide a beet harvesting machine of compact and durable construction, which, when drawn over a row of growing beets, will first cut or sever the tops of the beets and deposit said severed tops in windrows at one side of the machine and subsequently remove the topped beets from the ground and elevate the same onto an endless conveyor for delivery to a suitable gathering truck.

A further object of the invention is to provide a beet harvesting machine including a wheel-supported main frame having an auxiliary frame or working unit pivotally mounted thereon and provided with a yieldably supported supplemental frame movable independently of the auxiliary frame and carrying the beet topping mechanism, said auxiliary and supplemental frames being movable as a unit to elevated position when the machine is making a turn or being transferred from one field to another.

A further object of the invention is to provide a yieldably supported presser or feeler shoe adapted to engage the tops of the beets before said tops are severed by the cutting element, said shoe being adjustable both laterally and vertically to conform to ground surface conditions and also to vary the distance between the shoe and the blade of the cutting element and thus regulate the extent of cut of said element.

A further object is to provide a substantially bell-shaped cutting element carried by and mounted for rotation on the supplemental frame at the rear of the presser shoe so that the severed beet tops coming in contact therewith will be thrown laterally by centrifugal force in windrows at one side of the machine, and, should some of the growing beets project above the surface of the ground a greater distance than other beets, the open mouth of the bell-shaped cutting element will house and protect said projecting beets and prevent mutilation thereof as the machine travels over the rows of growing plants.

A further object is to so mount the digging elements on the auxiliary frame as to permit vertical and rotative adjustment thereof so as to regulate the depth of penetration of the ground-engaging members and the distance between said shoes, according to the size of the beets being harvested.

And a still further object of the invention is generally to improve this class of machines so as to increase their durability, utility and efficiency.

In the accompanying drawings:

Figure 7 is an enlarged detail sectional view showing the action of the presser shoe and how the bell-shaped cutting element protects the topped beet to prevent mutilation thereof, as the machine travels along a row of beets.

Figure 8 is a vertical sectional view taken on the line 8—8 of Figure 3, showing the manner of yieldably supporting the supplemental frame.

Figure 9 is a top plan view of the supplemental frame.

Figure 10 is a vertical sectional view taken on the line 10—10 of Figure 3.

Figure 11 is a bottom plan view of the bell-shaped beet top cutting element.

Figure 12 is a detail sectional view showing how the cutting blade is detachably secured to the bottom of the bell-shaped member.

Figure 13 is a detail view showing a serrated knife or blade which can be used instead of a smooth blade, if desired.

Figure 4:
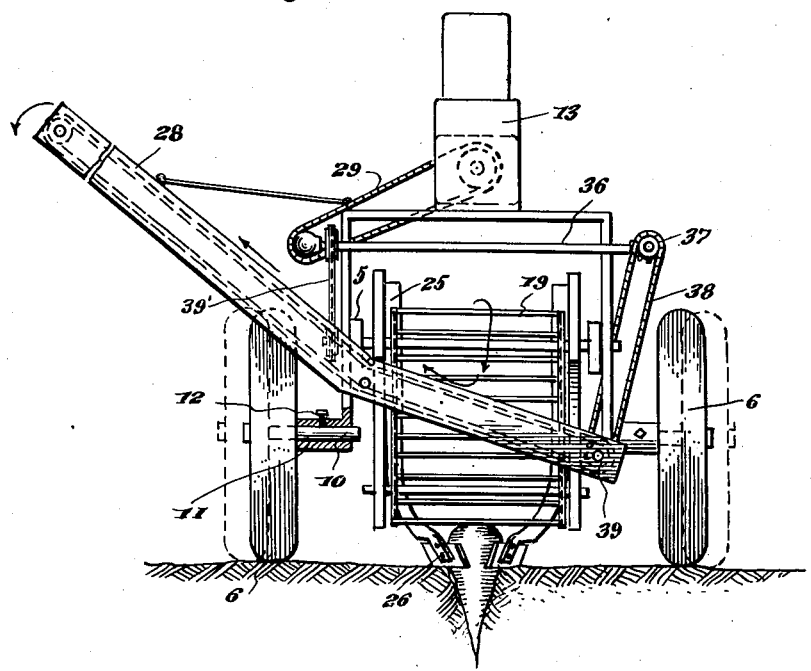
Figure 4 is a rear elevation.
Figure 5:
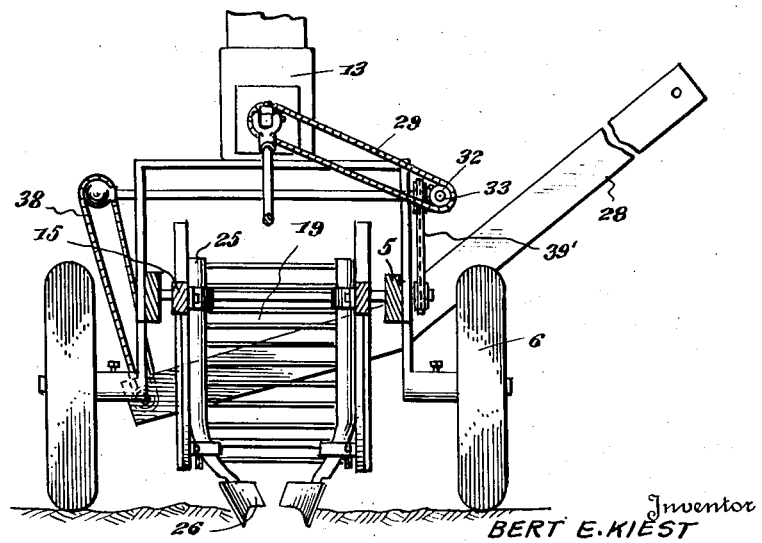
Figure 5 is a vertical sectional view taken on the line 5—5 of Figure 3.

The improved beet harvesting machine forming the subject matter of the present invention comprises a truck including a main supporting frame 5 having its rear end provided with wheels 6 and its front end tapered and formed with a depending flanged sleeve 7 adapted to receive a draft pin 8 carrying a clevis 9 for attachment to a tractor or other source of power. The rear wheels 6 are preferably provided with stub axles 10 telescopically mounted in tubular housings 11 so as to permit said wheels to be adjusted according to the width of the row of beets to be harvested, said wheels being retained in adjusted position by suitable clamping screws 12 extending through the housings and engaging the stub axles, as shown in Fig. 4.

Figure 2:
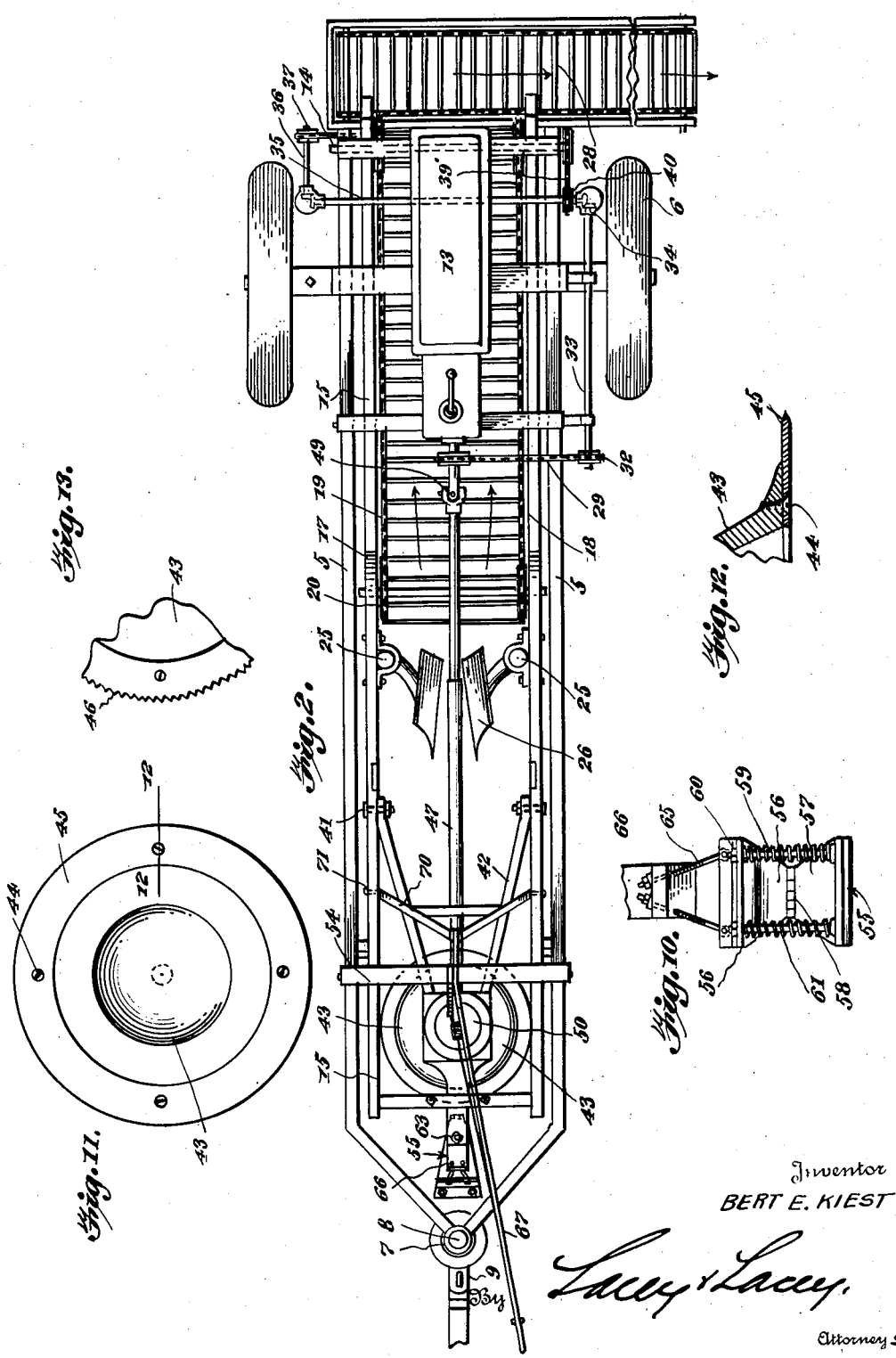
Figure 2 is top plan view.
Figure 3:
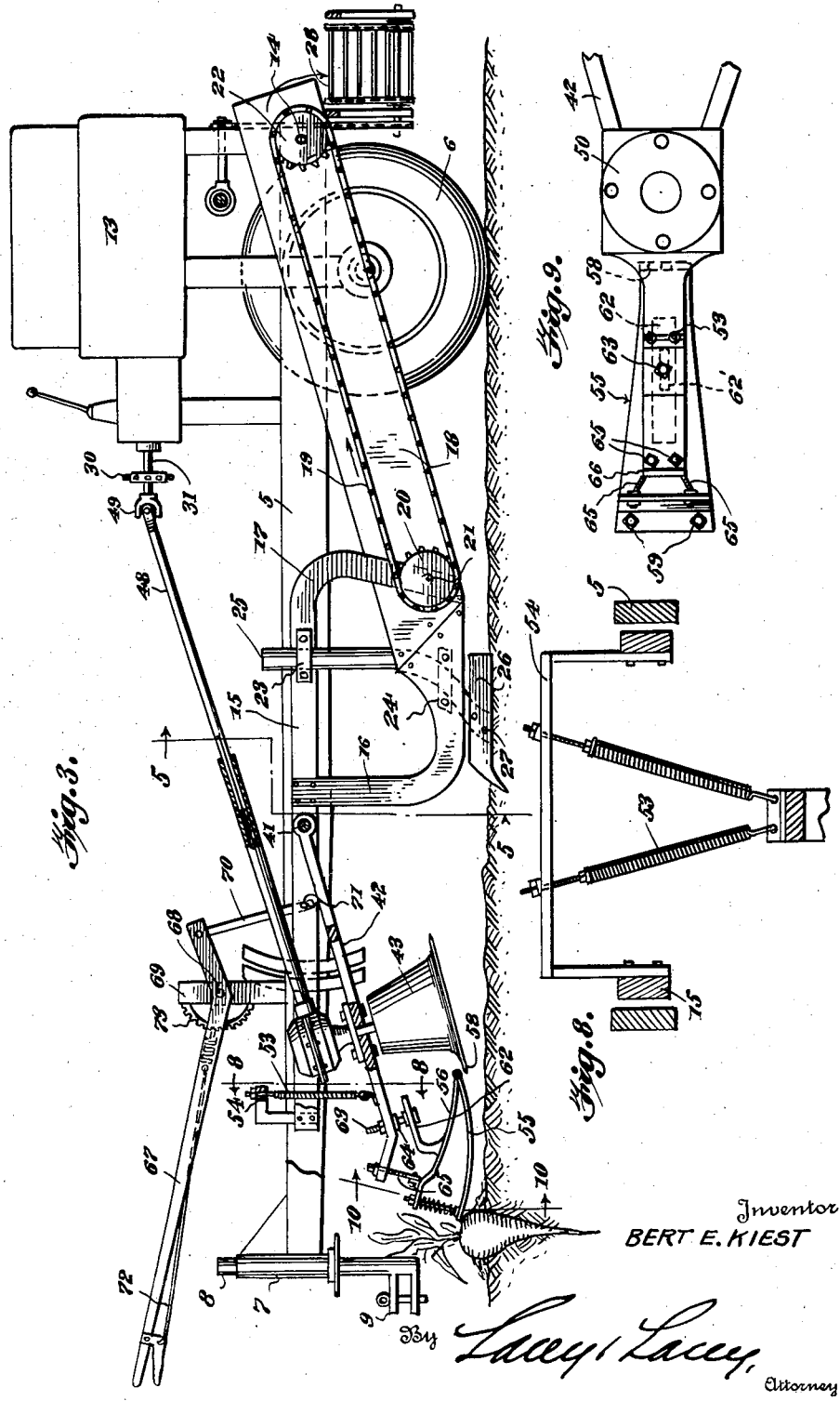
Figure 3 is a longitudinal sectional view.

Mounted on the rear of the main frame is an engine or other power unit 13 and extending transversely of the main frame beneath said power unit is a shaft 14 on which is pivotally mounted for tilting movement the adjacent end of an auxiliary frame or working unit 15 which frame fits within the main frame, as best shown in Figure 2 of the drawings.

Secured to and depending from the intermediate portion of the auxiliary frame 15 are bracing members 16 and 17 having their lower ends united and which members serve to receive and support the housing 18 of an upwardly inclined endless conveyor 19, the latter being preferably constructed of spaced bars to permit the discharge of loose earth during passage of the beets thereon. One end of the conveyor 19 is trained about sprocket wheels 20 mounted on a transverse shaft 21 journaled in the braces 17, the rear portion of the conveyor being trained around sprocket wheels 22 mounted on the transverse shaft 14, which shaft forms the pivotal axis of the auxiliary frame or working unit, as previously stated.

Mounted in suitable U-shaped clamps 23 and 24 secured to the braces 16 and 17, are vertically adjustable digging elements, each comprising a cylindrical shank 25 having its lower end deflected forwardly and provided with terminal shoes 26 detachably secured thereto by bolts 27. The shanks 25 are rotatably mounted in the upper clamps 23 so that, by removing the lower clamps 24, the shanks may be rotated to permit lateral adjustment of the shoes 26 to accommodate beets of different sizes, the shanks being retained in adjusted position by replacing the lower clamps 24 and tightening the bolts thereon.

Disposed transversely of the machine, at the rear end thereof, is an endless conveyor 28 which may be formed of one or more sections and which serves to deliver the beets to a suitable gathering truck. Motion is transmitted to the rear conveyor 28 by means of a sprocket chain 29 extending over a sprocket wheel 30 mounted on the projecting end 31 of the power shaft of the engine 13, said sprocket chain being trained around a similar sprocket wheel 32 secured to a longitudinal shaft 33 provided with a terminal pinion 34 which meshes with a corresponding pinion on a transverse shaft 35, the latter, in turn, meshing with a corresponding pinion on a rearwardly extending stub shaft 36. Secured to the end of the stub shaft 36 is a sprocket wheel 37 around which is trained a sprocket chain 38 leading to one of the sprocket wheels 39 of the rear conveyor 28. Motion is imparted to the sprocket wheel 22 of the conveyor 19 by means of a sprocket chain 39' operatively connected with a sprocket wheel 40 mounted on the rotating shaft 35.

Pivotally mounted at 41 on the auxiliary frame 15 is a supplemental frame 42, carrying the beet topping mechanism which will now be described. This beet topping mechanism comprises a hollow substantially bell-shaped carrying element 43, the lower edge of which is inclined upwardly and rearwardly and detachably secured to said lower inclined edge, by bolts or similar fasteners 44, is a circular cutting blade 45 which may either be smooth, as seen in Figure 11 of the drawings, or provided with a serrated edge, as indicated at 46 in Figure 13.

Extending upwardly from the small end of the bell-shaped member 43 is a shaft 44' provided with a bevel gear 45' which meshes with a corresponding bevel gear 46' on the adjacent section 47 of a telescopic shaft 48, the latter being connected with the stub shaft 31 of the power unit by a universal joint 49, so that power from the engine will be transmitted through the telescopic shaft and pinions 45' and 46' to the bell-shaped member 43 to rotate the same. The bell-shaped member 43 is supported on the supplemental frame 42 by means of a sectional housing 50 which serves to protect the pinions 45' and 46' and is provided with a lateral attaching flange 51 secured to the supplemental frame by bolts or similar fastening devices 52 so that the bell-shaped member 43 is free to move with the supplemental frame.

The supplemental frame is normally and yieldably supported on the auxiliary frame 15 by means of coil springs 53, the lower ends of which are attached to the supplemental frame while the upper ends thereof are secured to a transverse yoke 54 secured to and movable with the auxiliary frame, as best shown in Figure 8 of the drawings.

Associated with the bell-shaped cutting member 43 is a feeler or presser shoe 55, the purpose of which is to depress the tops of the beets so that said tops may be readily severed by the action of the cutting blade of the bell-shaped member. The presser shoe 55 is of substantially V-shape formation and comprises upper and lower plates 56 and 57 pivotally united at their converging ends, as indicated at 58, so as to permit said plates to be adjusted relative to each other. The wide or diverging ends of the plates 56 and 57 of the presser shoe are loosely united by bolts 59 provided with terminal nuts 60, and surrounding said bolts are coil springs 61 which yieldably support the plates in cooperative relation to each other and allow the plates to yield when coming in contact with the beet tops. Secured to the upper plate 56 is an overhanging arm or bracket 62 which is connected with the adjacent end of the supplemental frame 42 by means of a threaded bolt 63 extending through a longitudinal slot 62' in said arm for clamping engagement with nuts 64 so as to permit longitudinal adjustment of the shoe and also to permit vertical adjustment of said shoe at the pivotal junction of the plates 56 and 57 so as to vary the distance between the shoe and the cutting blade of the bell-shaped member and thus regulate the depth of cut of the bell-shaped member 43. Pivotally mounted on the upper plate 56 of the presser shoe are threaded bolts 65 which extend through slots in a projecting lip 66 on the supplemental frame so that by rotating said bolts, the lower surface of the presser shoe may be inclined laterally in either direction to accommodate different ground surface conditions. It will thus be seen that the presser shoe is not only yieldably supported on the supplemental frame, but the plates comprising said shoe are yieldably supported with respect to each other and that vertical adjustment of the rear end of the shoe may be effected by means of the bolt 63 and nuts 64. It will here be noted that the auxiliary frame carrying the digging elements, conveyor 19 and supplemental frame 42, can be swung upwardly as a unit with the shaft 14 as an axis, when it is desired to make a turn or when transporting the machine from place to place, so as to elevate the beet topping mechanism above the surface of the ground during transit of the machine. In order to effect this elevation of the parts, there is provided a lever 67 pivotally mounted at 68 on suitable supports 69 secured to the main frame 5, and provided with terminal links 70 pivotally connected at 71 to the auxiliary frame 15. The lever 67 is provided with a latch member 72 which coacts with a rack 73 for holding the lever in adjusted position. It will thus be seen that by depressing the lever 67, the auxiliary frame carrying the supplemental frame and topping mechanism can be elevated as a unit and in which position it will be held by the latch member, as will be readily understood.

The operation of the machine is as follows:

Prior to harvesting beets, the shoes of the digging elements are adjusted to accommodate the general size of the beets to be harvested, and the depth of cut of the knife on the bell-shaped member regulated by means of the bolt 63, which, as before stated, serves to vary the distance between the inner end of the shoe and the cutting blade on the bell-shaped member and thereby control the amount of the beet top to be cut by the topping mechanism.

Figure 1:
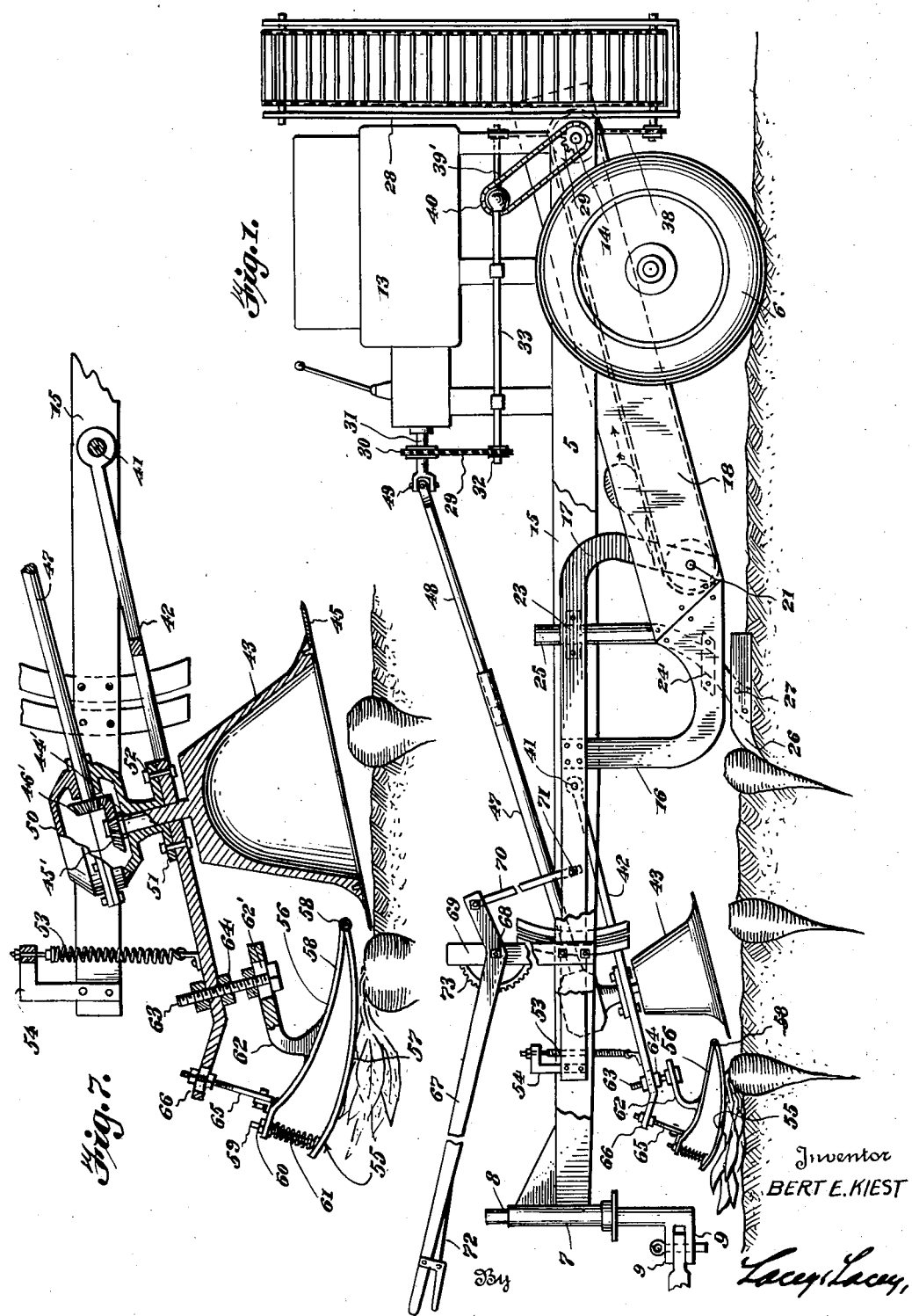
Figure 1 is a side elevation of a beet harvesting machine embodying the present invention, a portion of the frame being broken away to show the operating parts.

As the machine travels over a row of beets, the presser shoe will engage the tops of the beets and press said tops forwardly, as shown in Figs. 1 and 7, so as to permit the cutting blade on the bell-shaped member to sever said tops. As the tops are severed they will come in contact with the exterior surface of the bell-shaped member and, inasmuch as said member is constantly rotating, the beet tops coming in contact therewith will be thrown laterally at one side of the machine by centrifugal force and deposited on the ground in windrows.

Should one or more of the beets project above the surface of the ground a distance greater than the other beets, mutilation of the projecting beets will be prevented due to the inclination of the lower end of the bell-shaped member 43. In other words, as the rear portion of the lower end of the bell-shaped member is higher than the front portion thereof, the hollow end of the bell-shaped member will cover and protect the projecting end of the beet and the cutter will not mutilate the beet as the machine travels over a row of beets, as best shown in Figure 7 of the drawings.

When the machine reaches the end of a row of beets, the lever 67 is depressed, thereby elevating the auxiliary and supplemental frames, together with their associated parts, so as to permit the machine to make a turn. At this point, it is desired to emphasize the fact that the supplemental frame is, in fact, a yieldably supported floating frame, while the pressure shoe is independently yieldably supported, and as a result of this construction, should the presser shoe come in contact with an abnormally high beet top, the presser shoe will be elevated and, consequently, elevate the supplemental frame carrying the bell-shaped member and, after the presser shoe has cleared such projecting beet, said parts will drop downwardly to normal position, in which position they will be yieldably supported by the springs 53. After the topping of the beets has been effected, they will be engaged by the digging elements and directed upwardly between the shoes 26 to the conveyor 18 and thence onto the rear conveyor 23 for delivery into a suitable gathering truck.

Figure 6:
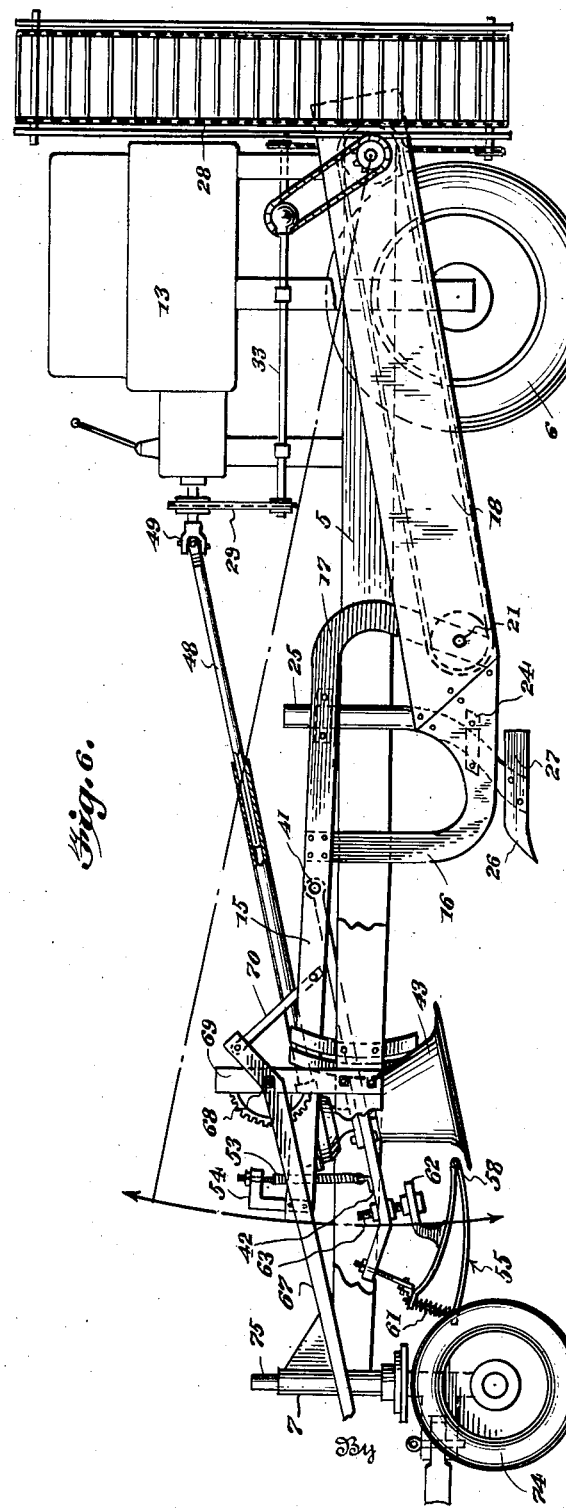
Figure 6 is a side elevation showing the operating parts moved to elevated position, and wheels mounted on the front of the machine to permit transportation of the machine from place to place.

When it is desired to transport the machine from one field to another, the draft pin 8 is removed and a wheeled truck 74 is positioned on the front end of the machine and retained in position by means of a pin 75 which fits within the sleeve 7, as best shown in Figure 6 of the drawings. It will, of course, be understood that, prior to transporting the machine from one place to another, the lever 67 will be actuated to raise the auxiliary and supplemental frames, together with their associated parts, to elevated position, so as to prevent said parts from contacting the ground.

The machine is strong and compact in construction and will effectually and expeditiously top the beets and deliver the topped beets into a gathering truck without danger of mutilating the beets, the topping mechanism being so constructed as to permit various adjustments thereof according to the size and nature of the beets to be topped and different ground surface conditions.

From the foregoing, it is thought that the construction and operation of the machine will be readily understood by those skilled in the art, and further description thereof is deemed unnecessary.

Having thus described the invention, what is claimed is:

1. A beet harvesting machine including a truck, a frame yieldably supported for pivotal movement on the truck, a hollow substantially bell-shaped member depending from the frame and mounted for rotation thereon, said bell-shaped member having its lower end inclined upwardly and rearwardly, a beet topping knife secured to the inclined end of said member, a substantially V-shaped presser shoe depending from the free end of the yieldably supported frame in front of the bell-shaped member and comprising pivotally connected plates, springs interposed between said plates, means for adjusting the presser shoe at the pivoted ends of said plates with respect to the cutting blade to vary the depth of cut of said blade, means for rotating the bell-shaped member, said bell-shaped member being hollow and adapted to successively cover and protect the topped beets, the pointed end of the presser shoe serving to direct the beet tops against the revolving bell-shaped member whereby the beet tops will be thrown laterally in windrows by centrifugal force at one side of the machine as said machine travels over a row of growing beets.

2. In a beet harvesting machine, a supporting frame, an auxiliary frame pivotally connected therewith, a floating supplemental frame yieldably mounted for pivotal movement on the auxiliary frame and movable independently thereof, a hollow substantially bell-shaped beet topping element mounted for rotation on said supplemental frame and having its lower edge about the open mouth of the lower end of the inner cavity of the bell externally thickened to form a wide annular edge face inclined rearwardly and upwardly with respect to the surface of the ground in which the beets are growing and its exterior surface inclined upwardly in the direction of said supplemental frame, said bell-shaped element defining an internal cavity extending from its open lower end to adjacent its upper end and unobstructed throughout its depth, a cutting blade forming a part of the topping element and secured to said inclined edge, means for rotating the topping element, a presser shoe depending from the supplemental frame in advance of the topping element and cooperating therewith whereby the severed beet tops will contact the inclined exterior surface of the bell-shaped topping element and be thrown by centrifugal force at one side of the machine, and means for adjusting the presser shoe with respect to said cutting blade to vary the depth of cut of said blade.

3. In a beet harvesting machine, a main frame, a supplemental frame yieldably mounted for pivotal movement thereon, a rotary cutting element mounted on and depending from the supplemental frame, and a presser shoe coacting with the cutting element and including converging pivotally united plates, springs interposed between the free ends of said plates, bolts connecting one of said plates to the supplemental frame, means for rotating the cutting element, and means for adjusting the shoe vertically with respect to the cutting edge of said element to regulate the amount of cut of said element, said bolts serving to tilt the shoe laterally to conform to different ground surface conditions.

4. In a beet harvesting machine, a main frame, a supplemental frame yieldably mounted for pivotal movement thereon, a hollow substantially bell-shaped cutting element depending from and mounted for rotation on the supplemental frame, a presser shoe depending from the supplemental frame in advance of the cutting element, said presser shoe comprising converging plates having their converging ends pivotally united, means for yieldably and adjustably supporting the shoe on the supplemental frame, an overhanging bracket secured to one of said plates and provided with a slot, and a bolt extending through said slot and engaging the supplemental frame.

5. In a beet harvesting machine, a main frame, a supplemental frame yieldably mounted for pivotal movement thereon and provided with a terminal lip, a hollow bell-shaped cutting element depending from and mounted for rotation on the supplemental frame, a presser shoe depending from the supplemental frame in advance of the cutting element, said pressure shoe comprising upper and lower converging plates having their converging ends pivotally united, springs interposed between the diverging ends of said plates, an overhanging bracket secured to the upper plate and provided with a slot, a bolt extending through said slot and engaging the supplemental frame, and adjusting bolts secured to the upper plate at the forward end of the shoe and engaging the lip on the supplemental frame.

BERT E. KIEST.